Feb. 28, 1939. M. P. LAURENT 2,148,628
GATE VALVE
Filed Dec. 5, 1935 2 Sheets-Sheet 2

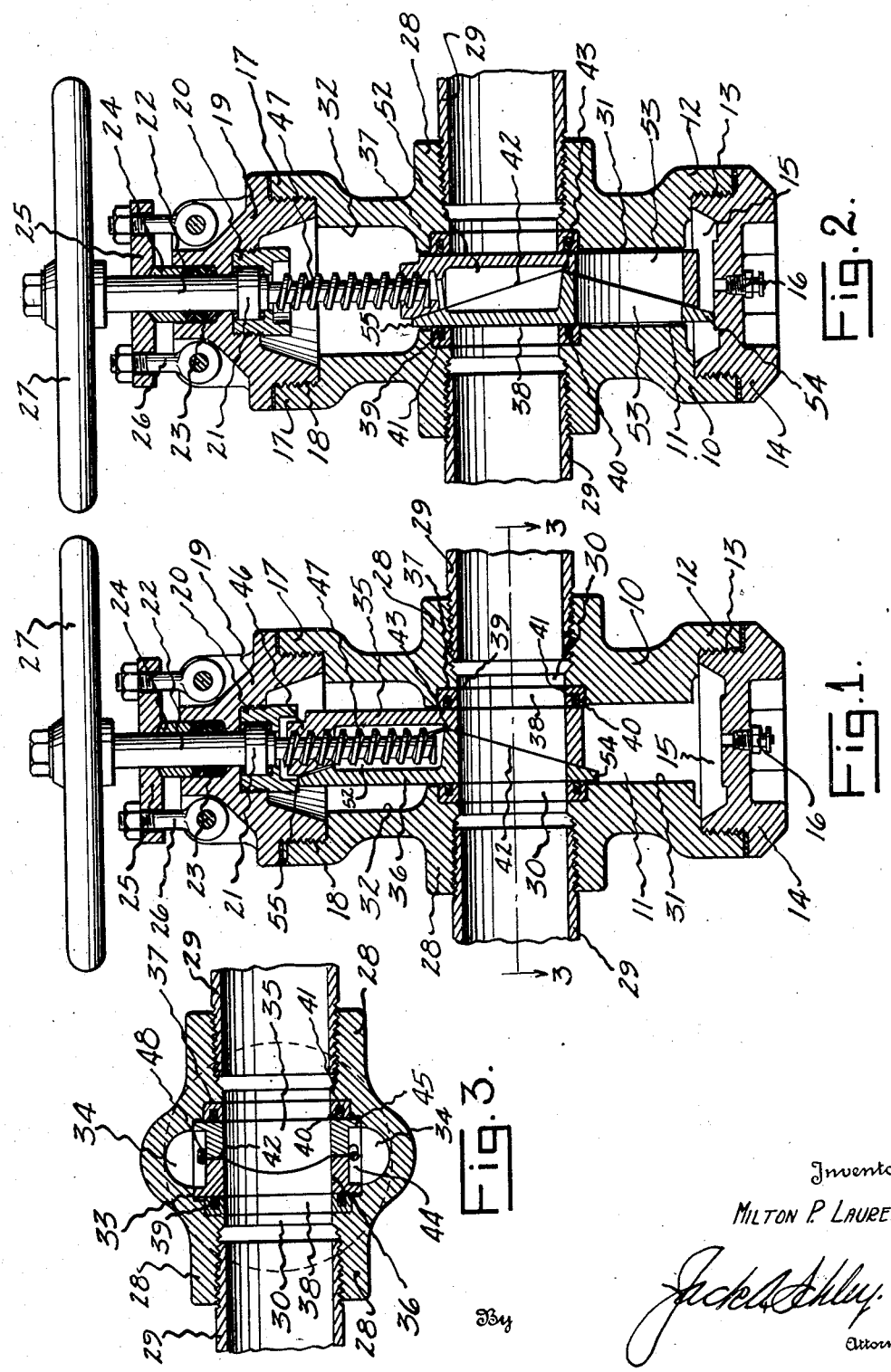

Inventor
MILTON P. LAURENT

By Jack A. Ashley
Attorney

Patented Feb. 28, 1939

2,148,628

UNITED STATES PATENT OFFICE 2,148,628

GATE VALVE

Milton P. Laurent, Houston, Tex., assignor to W. K. M. Company, Incorporated, Houston, Tex., a corporation of Texas Application December 5, 1935, Serial No. 52,941

1 Claim. (Cl. 251—51)

This invention relates to new and useful improvements in gate valves.

One object of the invention is to provide certain improvements in the valve set forth in my Letters Patent No. 2,002,780, issued May 28, 1935.

In this patent, separate guide members are employed in the gate chamber of the housing. The gate-engaging faces of these members must be ground and polished, to a high degree, so that the ground faces of the gate may have intimate contact therewith and provide fluid-tight seals when the gate is slid to its open and closed positions. In order to assure proper alining of the guide members, it is necessary that the side walls of the chamber, against which the guide members rest, be machined accurately so that the said guide members may be supported in parallel relation, otherwise the gate-engaging faces of said members would be out of line and cause the gate either to bind or to leak.

Further, the guide members of said patent must be formed with bosses on their rear sides, and these bosses must be properly located and finished to fit in the annular recess. These parts must be sufficiently accurate to aline the flanges of the opposite guide members and cause the gate to slide without deflection or binding. Also the annular seats, for the resilient sealing rings, must be cut in the faces of the guide members. The manufacture of what has been described is not only expensive, but tedious and requires a high degree of skill.

One object of the invention is to provide an improved gate valve in which the guide members are eliminated, and wherein the sealing or packing rings are mounted in seat rings embedded in the side walls of the gate chamber. Such an arrangement has many advantages. The seat rings may vary from each other and not effect the operation of the gate because they are not attached to guide members. These rings, being made separately, are readily fitted into housing recesses and the annular seats, for the sealing rings, are more easily formed in these seat rings.

Another object of the invention is to provide seat rings or collars having resilient sealing rings mounted therein, instead of the guide members, as in my Letters Patent, whereby the ground faces of the gate may slide over the faces of said rings, thereby doing away with other side guide faces in the gate chamber and producing a much more simple and less expensive device to manufacture.

Still another object of the invention is to provide a gate valve wherein the ground and polished faces of the gate have a greater width than the external diameter of the seat rings, thus assuring a more effective seal, particularly under high pressures; and also whereby the sliding contacts of the faces of the gates are confined to the faces of the seat rings and the sealing rings. The advantage of such a structure is that by reason of the resilient sealing rings carried by the seat rings, more effective sealing is had than where merely the faces of the seat rings were depended upon.

A still further object of the invention is to provide a gate valve having a gate chamber in which accurate machining of the side walls may be dispensed with, or if employed, separate guide members are not required.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a vertical, central, longitudinal sectional view of a gate valve, constructed in accordance with the invention, showing the gate in open position, Figure 2 is a similar view showing the gate closed, and Figure 3 is a horizontal cross-sectional view taken on the line 3—3 of Figure 1, Figure 4 is a view partly in elevation and partly in transverse vertical section showing the gate closed.

Figures 5, 6 and 7 are details of the gate,

Figure 8 is an enlarged vertical sectional view showing the seat and the sealing rings, Figure 9 is a similar view, the spring being omitted, and Figure 10 is a similar view showing a slightly modified form.

In the drawings, the numeral 10 designates the housing or body of the valve within which a vertical chamber 11 is formed for containing the operating parts. The valve housing is preferably cast, but may be formed in any suitable manner. An annular boss 12 is formed at the lower end of the housing and is provided with an internally screw-threaded recess 13 adapted to receive a screw-threaded, flanged cap 14 which overhangs the boss. The cap has a sump 15 in its upper side, which provides an enlarged cavity at the lower end of the chamber 11. The under side of the cap is countersunk and receives a drain plug 16, which is housed in said counter sink and thus is protected.

At the top of the housing, a boss 17, similar to boss 12, is provided and finished with internal screw-threads 18. A flanged bonnet 19 is screwed into the boss in the usual manner. The cap and bonnet are readily removable from the housing and are as readily screwed thereinto. A hanger bushing 20 is screwed into the under side of the bonnet for rotatably confining and supporting the integral collar 21 of a valve stem 22, extending through said bonnet.

A suitable packing 23 in the upper end of the bonnet is held in contact with the stem by a follower sleeve 24, which in turn is forced down by a cross head 25, secured and adjusted by eye bolts 26 pivoted to the top of the bonnet. These parts form a stuffing box and the stem 22 has a turning fit in the elements 19, 23, 24 and 25. The stem 22 extends above the cross head and a hand wheel 27, or any other turning medium, may be fastened thereon.

The opposite upright side walls of the housing 10 have exterior bosses 28, medially of the top and bottom bosses 12 and 17. These bosses 28 are also annular and are internally screw-threaded in the usual manner to receive the pipe ends 29, whereby the bores of the pipes are substantially alined with ports 30, communicating with the chamber 11.

As before stated, the chamber 11 extends vertically of the housing from the boss 12 to the boss 17. To amplify the length of this chamber, so as to give the gates sufficient travel, the sump 15 and dome of the bonnet 19 are provided. The opposite side walls or faces 31 of the chamber extend upwardly from the sump to a point a short distance above the ports 30 and are then recessed or cut back at 32, to form an enlarged cavity, which in conjunction with a bonnet may form a lubricant reservoir. The chamber has upright shoulders or guides 33 at substantially right angles to the faces 31, along the vertical edges thereof. Vertical channels 34, extending between these guides, provide for the passage of lubricant from the top to the bottom of the chamber 11.

The gate mechanism includes two elongate blocks 35 and 36, which require considerable care and skill in manufacturing. These blocks are adapted to slide vertically through the chamber 11 into the sump 15 as well as into the reservoir 32. The gate mechanism is capable of considerable variation in its detailed construction and while it is of the laterally expanding and retracting type, it is to be understood that any gate structure suitable for the purpose may be used.

Surrounding the ports 30, I provide annular recesses 37, countersunk in the faces 31 of the housing. In these recesses are fitted seat rings 38. It is desirable that these rings have a tight fit in the recesses 37 so that when they are engaged by the gate blocks, fluids under pressure will not by-pass said rings. It is desirable to make these rings of brass, bronze or any other metal which will co-act with the faces of the gate blocks in producing fluid-tight joints.

It is highly essential that the outer side faces of the blocks 35 and 36 be smoothly finished and it is preferable to grind and polish these faces, although the invention is not to be limited to such a procedure. By observing Figure 3, it will be seen that each block has a face considerably wider than its complementary ring 30. This assures intimate contact with the entire side face of the ring during all movements and positions of the gate blocks. While the rings may provide suitable contacts for forming fluid-tight joints, it has been found necessary, in order to provide fluid-tight contacts between the rings and the gate blocks, to employ packing or sealing rings 39 mounted in the seat rings so as to engage the faces of the gate blocks.

The seat rings 38 are formed with annular grooves or seats 40 for receiving the rings 39 and these grooves are made sufficiently deep to receive spring expanders 41, which engage the rings 39, and urge them outwardly into yielding contact with the faces of the gate blocks. It is desirable to make the sealing rings of spring metal but they may be made of any metal suitable for the purpose. The expanders 41 should be under such compression as to cause the rings 39 to maintain constant contact with the faces of the blocks, so as to prevent fluids passing through the housing or entering the housing from the pipes 29, from leaking into the chamber 11 or the reservoir 32.

The combination of the rings 38 and 39 provides such an adequate seal that the rings 38 may be made to project into the chamber 11 a sufficient distance to prohibit contact between the side faces 31 of the chamber and the polished faces of the gate blocks 35 and 36. This arrangement does not depend upon a contact between the faces of the blocks and the faces 31 to form seals, therefore the faces 31 need not be accurately machined or polished, but may be reamed out in the usual manner. However, if additional sealing surfaces are desirable, the rings 38 may be made to lie flush with the faces 31 and the latter finished so as to form sealing contacts with the faces of the blocks. It is pointed out that even though these latter faces are formed, there is a great advantage over the removable guide members of my former Letters Patent, and the housing may be made much more simple and more compact. If the rings 38 were misalined or slightly tilted, they would not interfere with the operation of the gate mechanism like such a condition would cause with the guide members in my Letters Patent. This would be particularly true where contact was had only with the rings 38 and 39.

The gate mechanism illustrated is somewhat similar to that illustrated in my Letters Patent referred to. The meeting or abutting faces 42 of the two gate blocks are angularly disposed, with respect to the line of movement of said blocks, to form surfaces which provide a wedging action when the two blocks are moving relatively to each other, for the purpose of expanding the gate mechanism against the rings 38 and 39, and against the faces 31, if desirable; or for retracting said blocks. In order to make this wedging action positive in both directions of vertical movement of the block 35 relatively to block 36, these abutting angular faces 42 diverge in both directions from a middle point 43. This arrangement forms a double wedge which is positive in either direction of movement of the gate block 35 relatively to the block 36.

The two gate blocks are assembled together as a unit and are movable as a unit, except when they are given a relative movement to expand or retract them. The blocks are recessed at 44 along their vertical ends complementary to the channels 34; and also to form guides 45, having sliding contact with the guides 33 of the chamber 11. The gate member 35 has an internally screw-threaded lug 46 at its upper end through which the lower screw-threaded portion 47 of the stem 22 extends. With the stem 22 being confined against vertical movement by the collar 21, it is obvious that when said stem is rotated by the hand wheel 27, the gate blocks will be elevated or raised, as is shown in Figure 1, or lowered, as is shown in Figure 2, depending upon the direction of rotation. The gate blocks are held in unitary relation, preferably by means of spring members 48, but under some conditions the wedging action alone is sufficient and the spring members are not necessary. These spring members are received in the recesses 44 and are curved at their ends 49, so as to hook over lugs 50 formed on the side face of the gate block 35 adjacent each end thereof. These spring members are flexed and their central portions are sprung under lugs 51 formed at the center of the other gate block 36. As the springs form no particular part of this invention and are fully described in my Letters Patent, they will not be described in detail herein.

Within the interior of the gate mechanism is a vertical socket 52, which intersects the angular wedging faces 42 of the gate blocks. This socket is of sufficient length to freely receive the screw-threaded end 47 of the stem, when the gate is raised. The upper position of the gate (Figure 1) corresponds to the open condition of the valve. Both gate blocks are provided with transverse ports 53, in their lower portions, adapted to aline with each other and also with the ports 30, when the gate is raised. When the gate is lowered or moved to its closed position (Figure 2) the ports 53 are below the rings 38, and consequently the valve is closed.

The sump 15 and the bonnet 19 receive the ends of the gate in its extreme positions. This permits the cap 14 and the bonnet 19 to be countersunk in the bosses 12 and 17, thereby reducing the height of the valve. As the gate approaches its lower position, a stop 54, formed by the lower projecting end of the gate block 36, engages the cap 14 at the bottom of the sump 15, and arrests further downward movement of said block. The rotating stem 22, however, continues to move the gate block 35, slightly relatively to the block 36, thus causing the former to ride on the wedging faces 42. This expansion of the blocks forces their faces tightly against the rings 38 and 39, thus sealing off the ports 30. When the gate blocks are moved to the upper position, a stop 55, at the upper end of the block 36 engages the depending rim of the bushing 20, whereby the expanding operation is repeated. Whenever the direction of rotation of the stem is reversed, the gate block 35 will be moved slightly, independently of the block 35, which will tend to retract the blocks, thus giving a freer movement when sliding the gate.

The fluid entering from the pipe 29 when the gate is closed will have a tendency to flow between the faces of the gate 35 or 36 and the seat ring 38 and enter the groove 40 along the inner side of the ring 39. The pressure fluid will also act to expand the ring 39 so as to bring about an intimate contact between the outer surface of said ring and the outer surface of the groove 40. The pressure fluid collecting in the groove will exert its force against the ring 39, thereby enhancing its contact with the gate block and producing a more effective seal. It will be seen that the purpose of the spring expander 41 is largely to force the ring 39 into engagement with the face of the block and cause the pressure fluid to enter the groove. This arrangement utilizes the pressure of the fluid to form the seal rather than the force exerted by the spring.

Under some conditions the spring expander 41 could be omitted as shown in Figures 9 and 10. As shown, the ring 39 has a width less than that of the groove 40 so as to permit the pressure fluid to enter said groove from the port 30. While it is desirable to have the spring, a more or less effective seal could be obtained without it. The objection to omitting the spring would be that the pressure fluid might pass between the face of the ring 39 and the block instead of entering the groove. By providing one or more ports 40', as shown in Figure 10, the spring would not be necessary and pressure fluid would be admitted to the groove 40, thereby assuring a sealing contact between the ring 39 and the gate block.

What I claim and desire to secure by Letters Patent is:

The herein described gate valve comprising, a housing body the integral rigid walls of which define an elongate valve chamber, said housing body being open at its opposite ends for access to said chamber, removable closures screw-threaded into the ends of the housing, one of said closures constituting a bonnet for the valve gate stem and each closure having a stop abutment, a valve gate comprising a cooperating pair of wedge elements having inner portions coacting to effect spreading of said wedge elements when moved endwise with relation to each other, one of said elements operated by the valve gate stem in said bonnet closure and the other element being arrested in its endwise movements by contact with the stop abutments of said end closures, the valve chamber exposed faces of two opposed housing body walls being parallel and flat finished, two opposite outer faces of said wedge elements being flat finished and traversing said wall faces in close relation thereto but not in tight bearing contact therewith, the opposite right sides of the valve gate having longitudinal marginal guide portions traversing guide portions of contiguous right walls of the valve chamber in close relation thereto but without tight bearing contact therewith, there being by-pass communication at said right sides of the valve gate between the opposite end portions of the valve chamber for a maintained lubricant, the housing body having alined ports in its walls opening into the valve chamber through said parallel wall faces, a seat ring surrounding each port opening and embedded with a leak-tight fit in an annular recess in the wall with the exposed face of the ring slightly above the wall face whereby to receive the contiguous face of the valve gate wedge element in tight bearing contact therewith, said seat rings provided with annular grooves having sealing rings therein urged into contact with the faces of the wedge elements, said wedge elements having registered openings extending transversely therethrough to establish communication between said housing body port openings in one position of the valve gate.

MILTON P. LAURENT.